United States Patent
Choi et al.

(10) Patent No.: US 7,391,680 B2
(45) Date of Patent: Jun. 24, 2008

(54) OPTICAL PICKUP SYSTEM AND DISK DRIVE WITH THE SAME

(75) Inventors: Un-jin Choi, Suwon-si (KR); Jae-hyun Youn, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 707 days.

(21) Appl. No.: 11/030,102

(22) Filed: Jan. 7, 2005

(65) Prior Publication Data

US 2005/0174899 A1    Aug. 11, 2005

(30) Foreign Application Priority Data

Feb. 10, 2004   (KR)  ............... 10-2004-0008646

(51) Int. Cl.
    *G11B 7/00*    (2006.01)
(52) U.S. Cl. ...................................... 369/44.14
(58) Field of Classification Search ............... None
    See application file for complete search history.

(56) References Cited

U.S. PATENT DOCUMENTS 5,754,022 A    5/1998   Uehara et al.
6,445,673 B2   9/2002   Park
6,947,369 B2 * 9/2005   Liao ........................ 369/223

FOREIGN PATENT DOCUMENTS

| JP | 05-094659 | 4/1993 |
|----|-----------|--------|
| JP | 11-176115 | 7/1999 |
| JP | 2002-216442 | 8/2002 |
| KR | 1999-43088 | 6/1999 |
| KR | 20-170778 | 12/1999 |

OTHER PUBLICATIONS

Korean Office Action dated Aug. 19, 2005 for Application No. 10-2004-0008646.

* cited by examiner

*Primary Examiner*—Paul W. Huber
(74) *Attorney, Agent, or Firm*—Staas & Halsey LLP

(57) ABSTRACT

A optical pickup system for use in a disk drive includes a stepping motor, a lead screw supported by a bracket and coupled to the stepping motor, in which the lead screw has spiral grooves formed on an outer periphery of the lead screw and engaged to a slider to move an optical pickup head in a radial direction of a disk, a plurality of guide shafts, installed to a main base in parallel with the lead screw, for guiding the optical pickup head in the radial direction of the disk, and a positioning mechanism for supporting the bracket which is installed to the main base to move in any direction to automatically maintain a position of the lead screw to the slider, thereby minimizing a load applied to the stepping motor.

20 Claims, 5 Drawing Sheets

OPTICAL PICKUP SYSTEM AND DISK DRIVE WITH THE SAME

CROSS-REFERENCE TO RELATED APPLICATION

This application claims the priority of Korean Patent Application No. 2004-8646, filed on Feb. 10, 2004 in the Korean Intellectual Property Office, the disclosure of which is incorporated herein in its entirety by reference.

BACKGROUND OF THE INVENTION

1. Field of the Invention

The present invention relates to a disk drive, and more particularly, to an optical pickup system for reciprocating an optical pickup head in a radial direction of a disk.

2. Description of the Related Art

Generally, a disk drive is an apparatus to read data from and/or write data on a disk-type optical medium (hereinafter referred to as an optical disk), and includes an optical pickup system for reciprocating an optical pickup head in a radial direction of the optical disk.

FIG. 1 is a top view depicting one example of a conventional main base 10, and FIG. 2 is a cross-sectional view depicting the main base in FIG. 1, to which a step motor 17 and a lead screw 16 are mounted. Referring to FIG. 1, the main base 10 is provided with a turntable 12 rotatably installed on the main base 10 in a coaxial relation with a spindle motor 11 and having an optical disk D seated thereon. The main base 10 further includes an optical pickup head 13 for writing the data on the optical disk D or reading the data from the optical disk D, and an optical pickup system for reciprocating the optical pickup head 13 in a radial direction of the optical disk.

The optical pickup system includes a pair of guide rails 14 and 15 for guiding the optical pickup head 13 to reciprocate in the radial direction of the optical disk D. The lead screw 16 installed in parallel to the guide rails 14 and 15 and has threaded grooves 16a formed on an outer periphery thereof. The stepping motor 17 is coupled to the lead screw 16 for rotating the lead screw 16. A slider 18 has one end secured to the optical pickup head 13 and the other end meshed with the threaded grooves 16a, so that rotary motion of the lead screw 16 is converted into linear motion to reciprocate the optical pickup head 13 in the radial direction of the optical disk D.

Referring to FIG. 2, the lead screw 16 is rotatably supported by a bracket 21 fixed to a plurality of supports 19 by means of screws 20. The supports 19 one fixed to the main base 10. The stepping motor 17 is coupled to the lead screw 16 to rotate the lead screw 16. As shown in FIG. 2, the screws 20 fit precisely in the bracket 21 and do not move relative to the bracket 21.

With the above construction, when the lead screw 16 is turned by the stepping motor 17, the optical pickup head 13 is reciprocated by the slider 18 in the radial direction of the optical disk D to write the data on the disk D or read the data from the disk D. In order to transfer a torque of the lead screw 16 to the slider 18, the slider 18 is meshed with the lead screw 16. Therefore, the lead screw 16 and the slider 18 should have a precise tolerance to smoothly transfer the power.

When assembling the optical pickup system, the slider 18 may become meshed with the lead screw 16 away from a tolerance range, or the lead screw 16 may be in or out of a parallel relation with the guide shaft 14 due to an external shock. In this case, the slider 18 is not properly meshed with the lead screw 16, so that the power is not smoothly transferred. A deviation in the assembly of the lead screw 16 and the slider 18 serves as a load to the lead screw 16 and thus to the stepping motor 17, which excessively consumes the electric current.

SUMMARY OF THE INVENTION

An aspect of the present invention provides a disk drive including a positioning mechanism capable of preventing a load from being applied to a lead screw, even though a deviation occurs in assembly of the lead screw and a slider, to smoothly transfer a driving power with a minimum electric power.

According to an aspect of the present invention, there is provided an optical pickup system comprising: a stepping motor; a lead screw supported by a bracket and coupled to the stepping motor, in which the lead screw has spiral grooves formed on an outer periphery of the lead screw and engaged to a slider to move an optical pickup head in a radial direction of a disk; a plurality of guide shafts, installed to a main base in parallel with the lead screw, for guiding the optical pickup head in the radial direction of the disk; and a positioning mechanism for supporting the bracket which is installed to the main base to move in any direction to automatically maintain a position of the lead screw to the slider, thereby minimizing a load applied to the stepping motor.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent and more readily appreciated by describing in detail exemplary embodiments thereof with reference to the accompanying drawings in which.

DETAILED DESCRIPTION OF THE EMBODIMENTS

Figure 1:
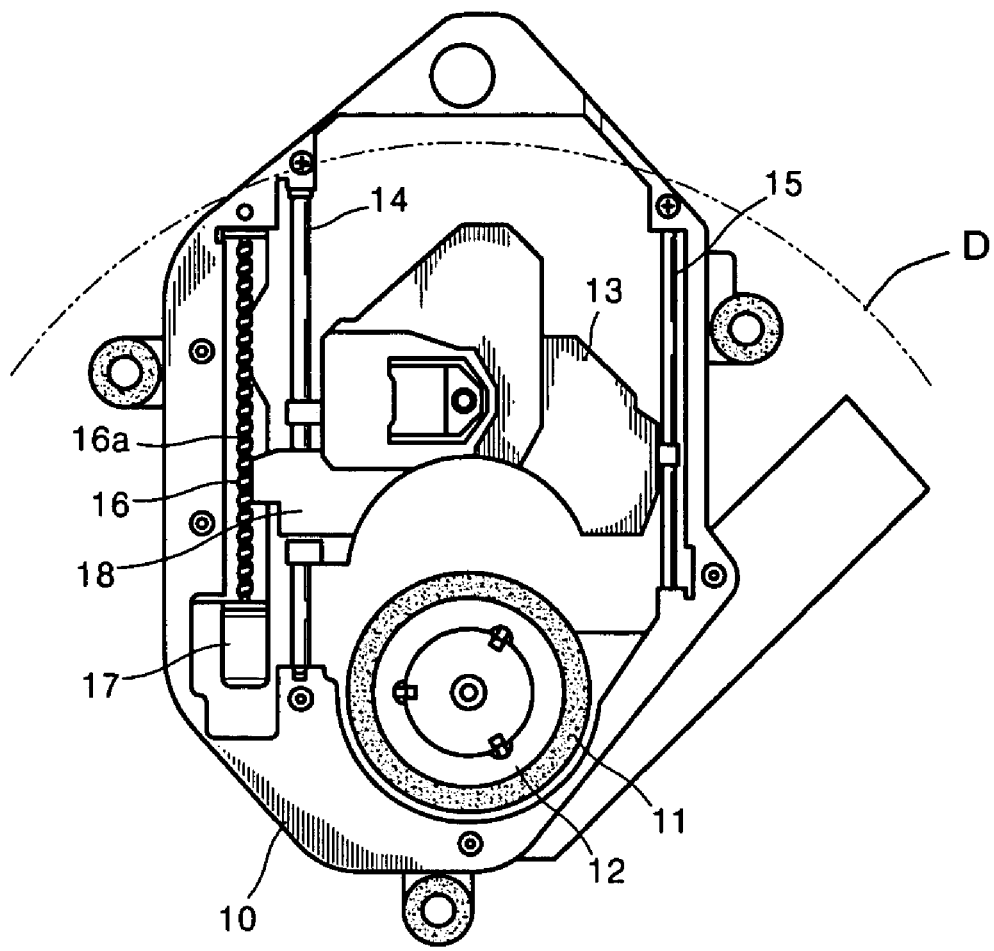
FIG. 1 is a top view depicting one example of a conventional main base.
Figure 2:
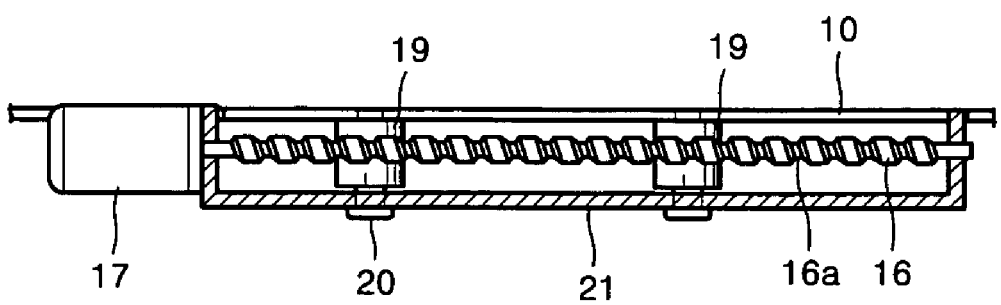
FIG. 2 is a cross-sectional view depicting the main base in FIG. 1, to which a step motor and a lead screw are mounted.

Reference will now be made in detail to an optical pickup system according to embodiments of the present invention. In the accompanying drawings, like parts are indicated by the same reference numerals. The embodiments are described below to explain the present invention by referring to the figures.

Figure 3:
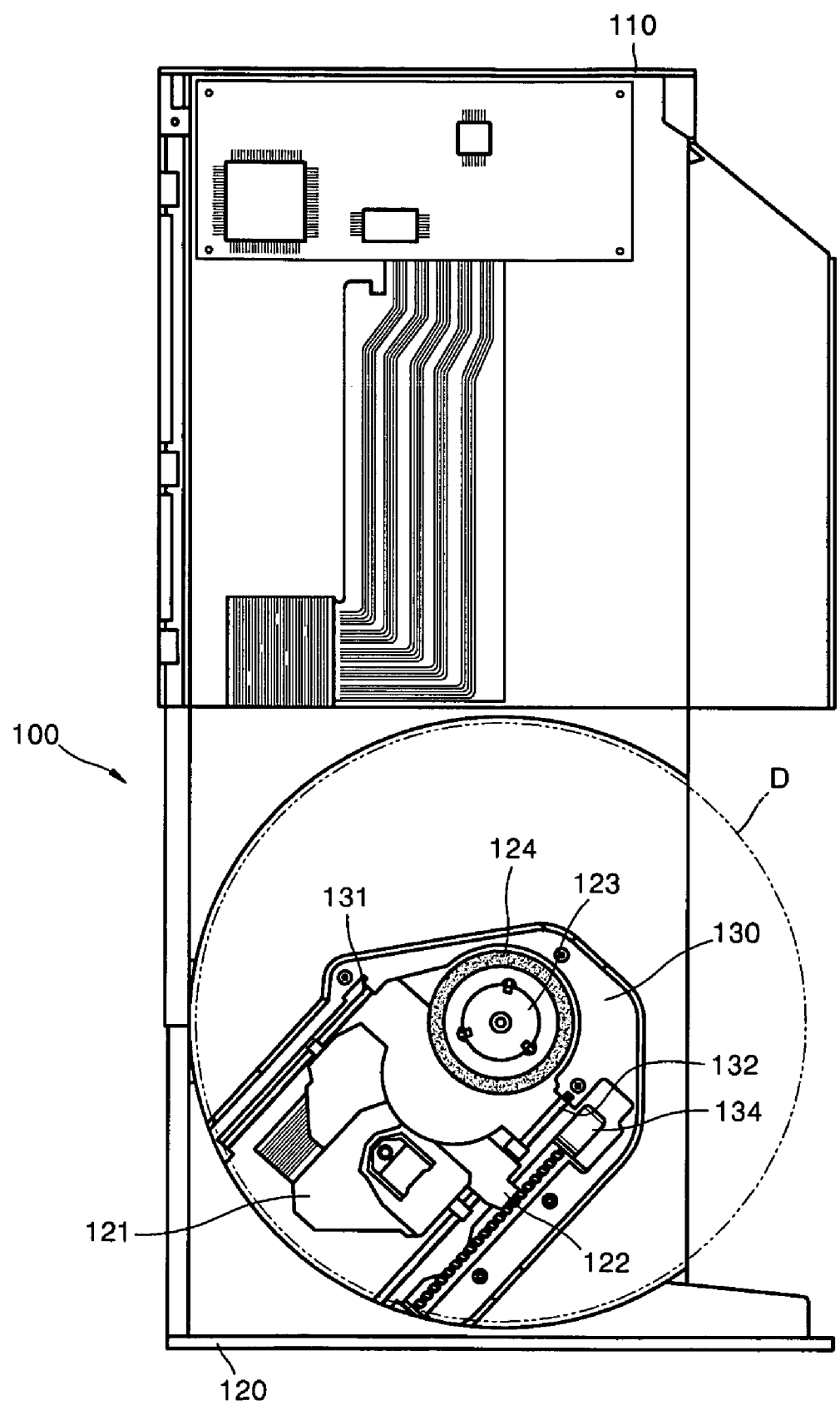
FIG. 3 is a top view depicting a disk drive including an optical pickup system employing a positioning unit according to an embodiment of the present invention.
Figure 4:
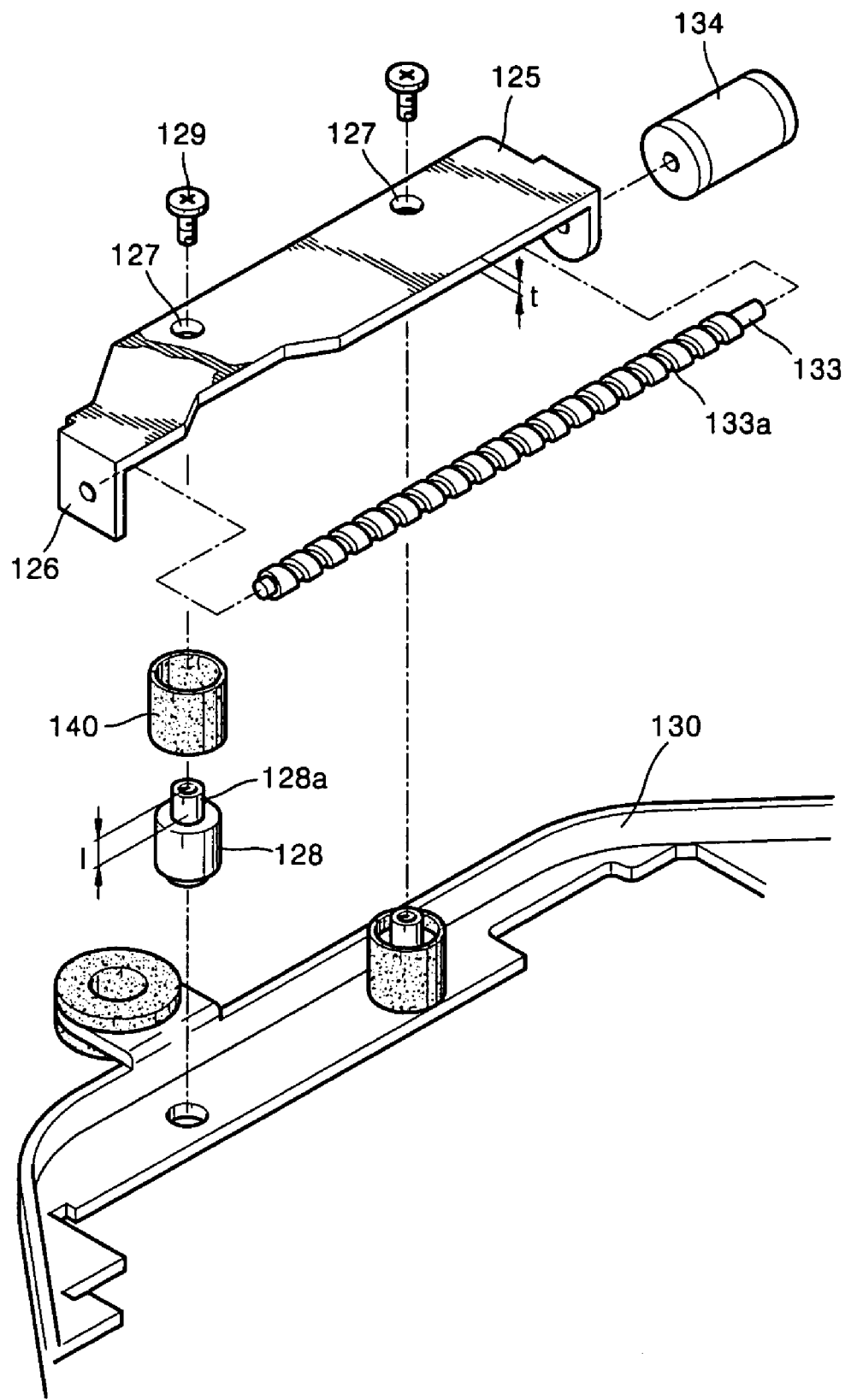
FIG. 4 is an exploded perspective view of the optical pickup system employing the positioning unit according to the embodiment of the present invention shown in FIG. 3.

Referring to FIGS. 3 though 5, a disk drive 100 includes a housing 110, a tray 120 accessible to the housing 110, and a main base 130 mounted on the tray 120 and having an optical pickup system for reciprocating an optical pickup head 121 in a radial direction of an optical disk D to read data from the optical disk and/or write the data on the optical disk D. The disk drive 100 includes a controller which controls recording and/or reproduction of data with respect to the optical disk D using the pickup head 121 and the optical pickup system.

The main base 130 includes a turntable 123 with the optical disk D seated thereon, and a spindle motor 124 is mounted coaxially on the turntable 123 for rotating the turntable 123.

The optical pickup system includes a plurality of guide shafts 131 and 132, a lead screw 133, a stepping motor 134, and a positioning unit 140. The guide shafts 131 and 132 are installed on the main base 130 in a radial direction of the optical disk D to guide the optical pickup head 121 in the radial direction of the optical disk D. The lead screw 133 is supported on the main base 130 by a bracket 125 to be parallel with the guide shafts 131 and 132. The lead screw 133 has spiral grooves 133*a* formed on an outer periphery of the lead screw 135.

The bracket 125 is supported on the main base 130 by a support 128 to move in any direction. The support 128 has one end secured to the main base 130. The other end of the support 128 is provided with a boss 128*a* to support the bracket 125 so that the bracket 125 can move in any direction as explained below.

The boss 128*a* has a length l longer than a thickness t of the bracket 125 in the shown embodiment. Further, the diameter of the boss 128*a* is less than the diameter of the hole 127 in the bracket 125 such that a gap exists therebetween. Consequently, even though the bracket 125 is fastened to the boss 128*a* by a fastening mechanism (for example, a screw 129 as shown), the bracket 125 is loosely supported to freely move on the boss 128*a*. However, it is understood that other fastening mechanisms can be used, that the gap need not be used in all aspects of the invention, and that the length l need not be greater than the thickness t in all aspects of the invention. Additionally, while shown as using a boss 128*a* extending from the support 128, it is understood that the boss 128*a* can instead be part of the screw 129 (such as a thickened portion or a screw having a larger diameter) or can be combinations of the parts of the screw 129 and support 128. Further, it is understood that the boss 128*a* can be installed in a through hole of the main base 130 in addition to or instead of the through hole 127 of the bracket 125.

The bracket 125 is provided at both ends thereof with a plurality of pivotal supports to rotatably support both ends of the lead screw 133. As shown, the pivotal supports are holes. However, it is understood that other pivots, such as indentations or slots, can be used instead of or in addition to the holes. Also, the bracket 125 is provided with a plurality of through holes 127 through which the boss 128*a* passes to fasten the screw 129 to the boss 128*a*. Preferably, the through hole 127 has a diameter greater than the diameter of the boss 128*a* such that a gap forms between the boss 128*a* and the hole 127.

The stepping motor 134 is coupled to one side of the lead screw 133 to rotate the lead screw 133. While described as a stepping motor, it is understood that other types of motors can be used, and that transmission mechanisms can be used so that the screw 133 is not collinear to and/or directly connected with the screws 133.

The positioning unit 140 is adapted to resiliently support the bracket 125 by enclosing an outer periphery of the support 128 between the bracket 125 and the main base 130. A position of the lead screw 133 to the slider 122 is automatically maintained so that the power can be smoothly transferred when the bracket 125 moves in any direction. With the above construction, it is possible to minimize a load applied to the stepping motor 134.

Figure 5:
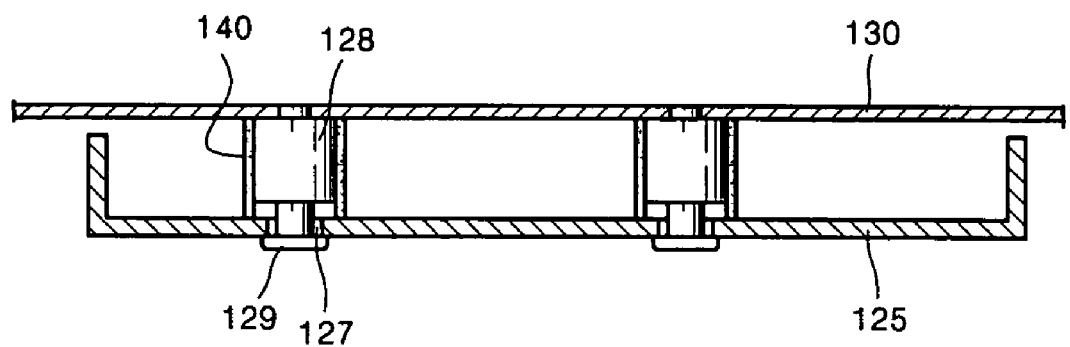
FIG. 5 is a cross-sectional view of the optical pickup system employing the positioning unit in FIG. 4.

Referring to FIG. 5, the positioning unit 140 according to an embodiment of the present invention is in contact with the bracket 125 and the main base 130. The positioning unit 140 is constructed so as to resiliently bias the bracket 125 so that the bracket 125 is spaced apart from the main base 130 by a desired interval. The bracket 125, which is fastened to the boss 128*a* by the screw 129, is resiliently biased away from the main base 130 by the positioning unit 140 so as to be adhered closely to the screw 129.

Figure 9:
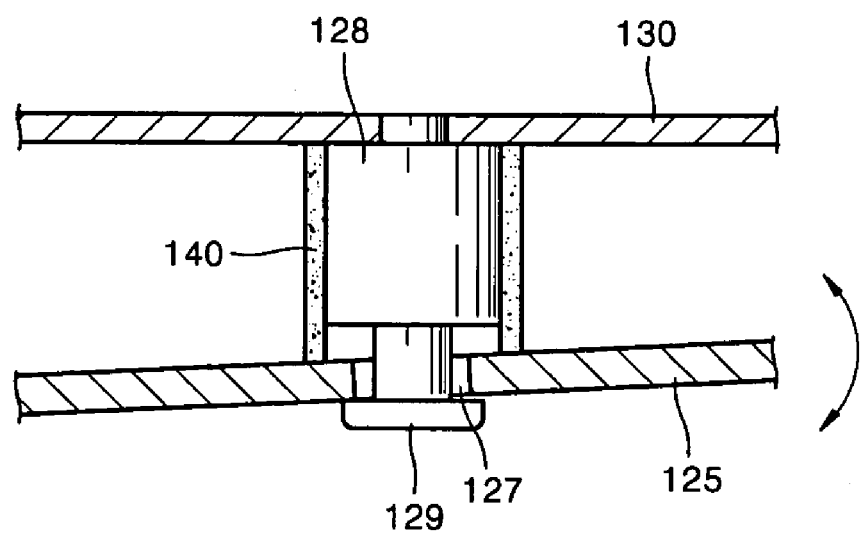
FIG. 9 is a cross-sectional view depicting an operation of a positioning unit according to the embodiment of the present invention shown in FIG. 3.

As shown in FIG. 9, even though the bracket 125 moves in a vertical direction, the positioning unit 140 resiliently supports the bracket 125. For example, the positioning unit 140 can be made of a resilient member, such as rubber or polyurethane, so as to provide a biasing force when the positioning unit 140 is pressed. However, it is understood that other biasing mechanisms can be used. The position of the lead screw 133 to the slider 122 is automatically adjusted, such that there is no load between the lead screw and the slider 122. Consequently, no additional load is applied to the stepping motor 134.

Figure 6:
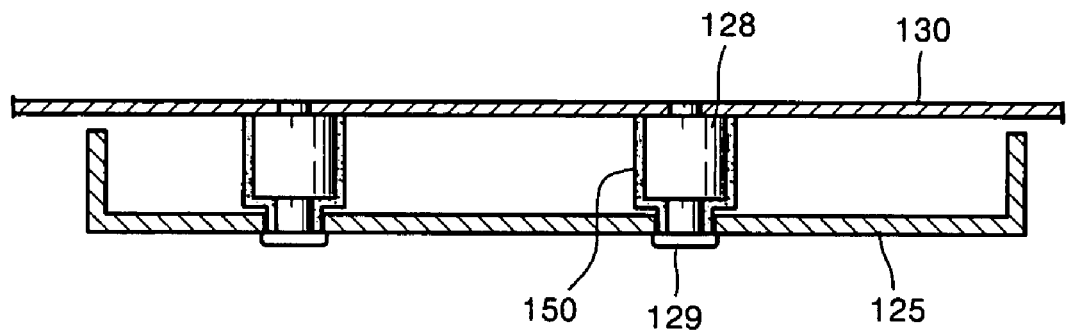
FIG. 6 is a cross-sectional view depicting an optical pickup system employing a positioning mechanism according to an embodiment of the present invention.

FIG. 6 is a cross-sectional view depicting an optical pickup system employing a positioning unit 150 according to an embodiment of the present invention. Referring to FIG. 6, the positioning unit 150 encloses an outer periphery of the support 128 and an outer periphery of the boss 128*a*, and is adapted to pass through the through hole 127 to be in contact with the screw 129.

Figure 7:
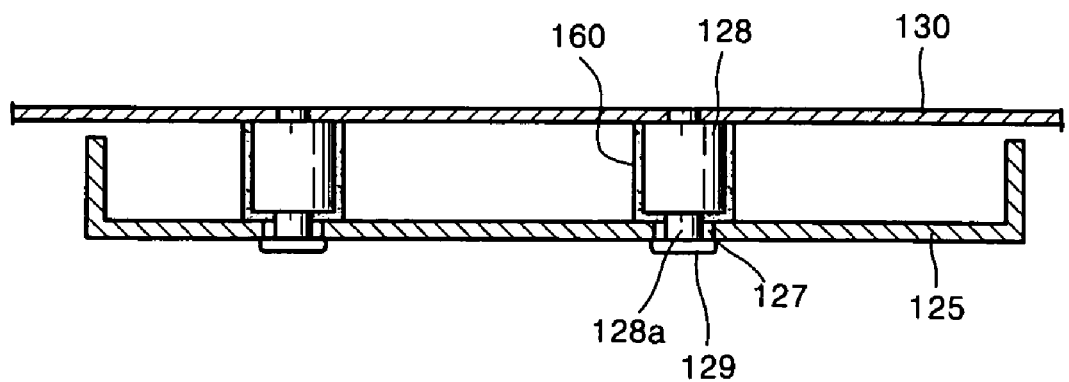
FIG. 7 is a cross-sectional view depicting an optical pickup system employing a positioning unit according to an embodiment of the present invention.

FIG. 7 is a cross-sectional view depicting an optical pickup system employing a positioning unit 160 according to an embodiment of the present invention. Referring to FIG. 7, the positioning unit 160 encloses an outer periphery of the support 128 and partially an outer periphery of the boss 128*a*, and does not pass through the through hole 127.

Figure 8:
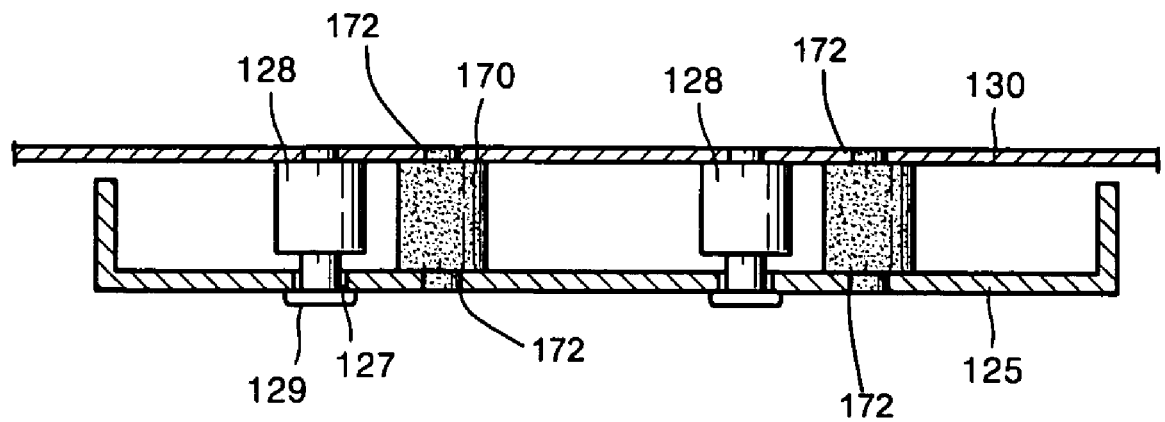
FIG. 8 is a cross-sectional view depicting an optical pickup system employing a positioning unit according to embodiment of the present invention.

FIG. 8 is a cross-sectional view depicting an optical pickup system employing a positioning unit 170 according to an embodiment of the present invention in which the positioning mechanism 170 is separately provided from the support 128 and boss 128*a*. Referring to FIG. 8, the positioning unit 170 resiliently supports the bracket 125 between the main base 130 and the bracket 125 and is connected to the bracket 125 and 130 using separate through holes 172. The positioning unit 170 may be positioned in any point on the bracket 125.

While not required, it is understood that optical pickup systems can use combinations of the positioning units 140, 150, 160, and/or 170. Moreover, it is understood that the resilience of the positioning units 140, 150, 160, and/or 170 can be provided using springs or other biasing mechanisms instead of or in addition to using a biasing material. Further, while the positioning units 140, 150, 160, and/or 170 are shown directly connected between the bracket 125 and the main base 130, that additional spacers can be installed between the positioning units 140, 150, 160, and/or 170 and one or both of the bracket 125 and main base 130 such that the positioning units 140, 150, 160, and/or 170 need not extend a full length of a separation distance between the bracket 125 and the main base 130.

As shown in FIG. 8, the positioning unit 170 has a cylindrical shape, but the shape is not limited thereto. Any variations may be applied if the positioning unit may resiliently support the bracket 125 between the main base 130 and the bracket 125. Similarly, while the shape of the positioning units 140, 150, 160, and/or 170 generally are cylindrical since the support 128 and boss 128*a* are shown as cylindrical, it is understood that other shapes can be used and that the shape of the positioning units 140, 150, 160, and/or 170 need not be the same as the shape of the support 128 and boss 128*a* in all aspects of the invention.

With the above description, according to the optical pickup system of an aspect of the present invention, the bracket is movably installed to the base, and is resiliently supported by the positioning unit, thereby minimizing the load applied to the stepping motor and thus stably operating the optical pickup head.

While the aspects of the present invention have been particularly shown and described with reference to exemplary embodiments depicted in the drawings, it will be understood by those of ordinary skill in the art that various changes and modifications in form and details may be made therein without departing from the spirit and scope of the present invention. Therefore, the true spirit and scope for protection of the present invention will be defined by the following claims and their equivalents.

What is claimed is:

1. An optical pickup system for use with a disk, comprising:
    an optical pickup head to transfer data with respect to the disk;
    a slider to which the optical pickup head is attached;
    a stepping motor to provide a torque;
    a lead screw coupled to the stepping motor and having spiral grooves formed on an outer periphery of the lead screw, the spiral grooves being engaged to the slider to move the optical pickup head in a radial direction of the disk according to the torque;
    a main base;
    a bracket which rotatably supports the lead screw relative to the main base;
    a plurality of guide shafts installed on the main base to be substantially parallel with the lead screw and which guide the optical pickup head in the radial direction of the disk; and
    a positioning mechanism which supports the bracket relative to the main base and which is installed on the main base to allow the bracket to move in a plurality of directions relative to the main base to automatically maintain a position of the lead screw relative to the slider to minimize a load applied to the stepping motor due to a misalignment between the lead screw and the stepping motor.

2. The optical pickup system of claim 1, wherein the positioning unit is shaped to support the bracket between the main base and the bracket to resiliently support the bracket as the bracket moves relative to the main base.

3. The optical pickup system of claim 1, further comprising a support having one end secured to the main base and another end having a boss, wherein:
    the bracket is supported by the boss,
    the boss is fastened to the bracket by a fastening mechanism so that the bracket can move in the plurality of directions, and
    the positioning mechanism encloses the support.

4. The optical pickup system of claim 1, wherein the positioning mechanism comprises a resilient member having a resilient force.

5. A disk drive for use with a disk, comprising:
    a housing;
    a tray accessible to the housing; and
    a main base mounted on the tray, the main base including a turntable on which the disk is disk seated, a spindle motor for rotating the turntable, an optical pickup head for reading data from the disk or writing the data on the disk, and an optical pickup system for moving the optical pickup head in a radial direction of the disk,
    wherein the optical pickup system comprises:
        a stepping motor;
        a slider to which the optical pickup head is attached;
        a lead screw coupled to the stepping motor and having spiral grooves formed on an outer periphery of the lead screw, the spiral grooves being engaged to the slider to move the optical pickup head in a radial direction of the disk;
        a bracket which rotatably supports the lead screw relative to the main base;
        a plurality of guide shafts installed on the main base substantially in parallel with the lead screw and which guide the optical pickup head in a radial direction of the disk; and
        a positioning mechanism which supports the bracket relative to the main base and which is installed on the main base to allow the bracket to move in a plurality of directions relative to the main base to automatically maintain a position of the lead screw relative to the slider to minimize a load applied to the stepping motor due to a misalignment between the lead screw and the stepping motor.

6. The disk drive of claim 5, wherein the positioning mechanism is shaped to support the bracket between the main base and the bracket to resiliently support the bracket as the bracket moves relative to the main base.

7. The disk drive of claim 5, wherein:
    the optical pickup system further comprises a support having one end secured to the main base and another end having a boss,
    the bracket is supported by the boss,
    the boss is fastened to the bracket by a fastening mechanism so that the bracket can move in the plurality of directions, and
    the positioning mechanism encloses the support.

8. The disk drive of claim 5, wherein the positioning mechanism comprises a resilient member having a resilient force.

9. An optical pickup system for use with a disk, comprising:
    an optical pickup unit to transfer data with respect to the disk;
    a motor to provide a torque;
    a lead screw coupled to the stepping motor such that threads of the lead screw rotate to move the optical pickup unit according to the torque;
    a base;
    a bracket which rotatably supports the lead screw relative to the base;
    a guide unit which guides the optical pickup unit as the optical pickup unit is moved in the radial direction of the disk by the motor to be substantially parallel with the lead screw; and a positioning mechanism disposed between the base and the bracket and which biases the bracket away from the base so as to allow the bracket to move in a plurality of directions relative to the base.

10. The optical pickup system of claim 9, further comprising a supporting mechanism which is rotatably connected at one of the bracket and the base.

11. The optical pickup system of claim 10, further comprising the supporting mechanism is further slideably connected at the one of the bracket and the base.

12. The optical pickup system of claim 11, wherein the position mechanism presses the bracket away from the base so as to maintain a predetermined separation distance from the base in a first direction.

13. The optical pickup system of claim 10, wherein:
the bracket comprises a through hole having a first width, and
the supporting mechanism comprises a boss inserted into the through hole and having a second width less than the first width such that a gap is formed between the bracket and the boss.

14. The optical pickup system of claim 13, wherein the position mechanism comprises a resilient material connected to the base and the bracket and enclosing the supporting mechanism.

15. The optical pickup system of claim 14, wherein the position mechanism further extends into the through hole so as to be in the gap between the boss and the bracket.

16. The optical pickup system of claim 13, wherein:
the through hole of supporting mechanism is disposed a first location on the bracket, and
the position mechanism comprises a resilient material connected to the base and the bracket and is disposed at a second location on the bracket other than the first location.

17. The optical pickup system of claim 16, wherein:
the bracket comprises a second through hole at the second location other than the first location, and
the position mechanism comprises an extension which extends into the second through hole to connect the position mechanism at the second location.

18. The optical pickup system of claim 9, wherein the guide unit comprises at least one guide rail installed on the base to be substantially parallel with the lead screw and which guides the optical pickup unit in the radial direction of the disk.

19. A disk drive for use with a disk, comprising a housing enclosing the optical pickup system of claim 9.

20. The disk drive of claim 19, further comprising a tray slideably attached in the housing and on which the base is mounted.

* * * * *